US00RE47575E

(19) United States
(12) Reissued Patent
Shiono

(10) Patent Number: US RE47,575 E
(45) Date of Reissued Patent: *Aug. 20, 2019

(54) INK SET, RECORDING METHOD, RECORDING APPARATUS, AND RECORDING MATERIAL

(71) Applicant: Seiko Epson Corporation, Tokyo (JP)

(72) Inventor: Shohei Shiono, Matsumoto (JP)

(73) Assignee: Seiko Epson Corporation (JP)

( * ) Notice: This patent is subject to a terminal disclaimer.

(21) Appl. No.: 15/598,761

(22) Filed: May 18, 2017

Related U.S. Patent Documents

Reissue of:
(64) Patent No.: 9,034,460
Issued: May 19, 2015
Appl. No.: 14/196,503
Filed: Mar. 4, 2014

(30) Foreign Application Priority Data

Mar. 6, 2013 (JP) ..... 2013-043796

(51) Int. Cl.
*C09D 11/322* (2014.01)
*C08K 5/053* (2006.01)
(Continued)

(52) U.S. Cl.
CPC ..... *C09D 11/322* (2013.01); *B41J 2/01* (2013.01); *C09D 11/324* (2013.01); *C09D 11/38* (2013.01);
(Continued)

(58) Field of Classification Search
None
See application file for complete search history.

(56) References Cited

U.S. PATENT DOCUMENTS 7,988,277 B2 * 8/2011 Moribe ..... C09D 11/40 106/31.27
8,011,777 B2 * 9/2011 Yamashita ..... C09D 11/322 106/31.6
(Continued)

FOREIGN PATENT DOCUMENTS

JP 2009-287003 A 12/2009

*Primary Examiner* — Elizabeth L McKane
(74) *Attorney, Agent, or Firm* — Harness, Dickey & Pierce, P.L.C.

(57) ABSTRACT

An ink set includes a first ink composition, and a second ink composition, in which the first ink composition contains a first pigment, and an alkyl diol having carbon atoms of 6 or less and a normal boiling point of 240° C. or more, the second ink composition contains a second pigment, and the alkyl diol, in the first ink composition, a content of the first pigment is 2.5% by [weight] *mass* or more, and a content of the alkyl diol is 3% by [weight] *mass* to 15% by [weight] *mass*, in the second ink composition, a content of the second pigment is less than 2.5% by [weight] *mass*, and the content of the alkyl diol is 8% by [weight] *mass* to 30% by [weight] *mass*, and the content of the alkyl diol in the second ink composition is greater than the content of the alkyl diol in the first ink composition.

9 Claims, 1 Drawing Sheet

(51) Int. Cl.

| | |
|---|---|
| ***B41J 2/01*** | (2006.01) |
| ***C09D 11/324*** | (2014.01) |
| ***C09D 11/38*** | (2014.01) |
| ***C09D 11/40*** | (2014.01) |

(52) U.S. Cl.
CPC ..... *C09D 11/40* (2013.01); *Y10T 428/24901* (2015.01)

(56) References Cited

U.S. PATENT DOCUMENTS

| | | | | |
|---|---|---|---|---|
| 8,586,647 | B2 * | 11/2013 | Kojima et al. | 523/160 |
| 2005/0039632 | A1 * | 2/2005 | Yamamoto | C09D 11/40 106/31.27 |
| 2009/0274840 | A1 | 11/2009 | Yamakami et al. | |
| 2012/0262517 | A1 * | 10/2012 | Takaku | C09D 11/322 347/20 |
| 2013/0300802 | A1 | 11/2013 | Yamakami et al. | |

* cited by examiner

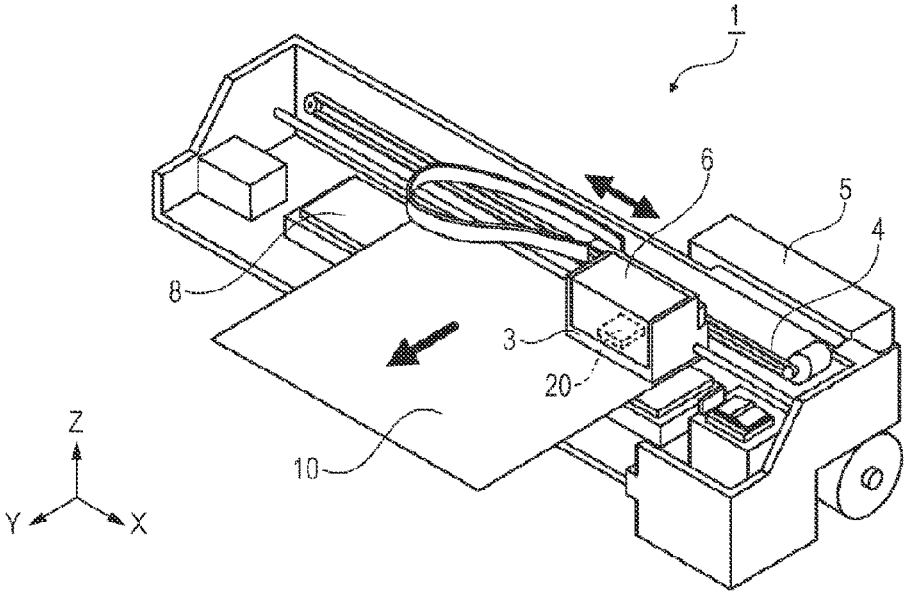
1
6
5
4
8
3
20
10
Z
Y
X

INK SET, RECORDING METHOD, RECORDING APPARATUS, AND RECORDING MATERIAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Technical Field

The present invention relates to an ink set, a recording method, a recording apparatus, and a recording material.

2. Related Art

A printing method using an ink jet recording system is performed by discharging and flying an droplet of an ink and adhering (landing) the droplet of the ink onto a recorded medium such as paper. By an innovative advance of an ink jet recording technology in recent years, a recording method using the ink jet recording system is used in a field of a high definition image recording (image printing) where a photography or an offset printing has been used up to this day.

In the ink jet recording system, in order to perform the high definition recording more accurately, an discharged amount of the ink droplet is made as the very small amount such as several picoliters, and a diameter of a nozzle for discharging the ink and a gap between the nozzles are made smaller. For example, in JP-A-2009-287003, there is disclosed an ink for ink jet including a specific alkane diol such as 1,2-hexanediol that can be applied to a recording head corresponding to a high definition (recording head (discharging head) where a first nozzle of which a separate flow path is relatively short and a second nozzle of which the separate flow path is relatively long are alternately arranged at the arrangement gap of less than 30 μm therebetween).

However, since a penetrating agent having a low boiling point is mainly used in the ink for ink jet according to JP-A-2009-287003, there is a problem that a volatilization amount of an organic solvent from an image which is recorded (VOC: Volatile Organic Compounds) becomes large. Furthermore, when the penetrating agent such as 1,2-hexanediol is not used, it is difficult to secure a dot area by such a reason that permeability (wettability) is not able to be secured, and there is a problem that a recording time becomes long if the amount of the ink droplet is not increased or a driving speed of the head is not increased. However, there is a concern that means for dealing with the problems cause new problems such as unstability of discharging and occurrence of bleeding. Moreover, it is necessary to increase the driving speed of the recording head or the amount of the droplet, in order to perform the recording to the recording medium having larger size at high speed. As a result, there is also a problem that a landing deviation of the ink droplet or the like causes deterioration in an image quality.

SUMMARY

The invention can be realized in the following application examples or forms.

Application Example 1

According to this application example, there is provided an ink set including a first ink composition, and a second ink composition. The first ink composition contains a first pigment, and an alkyl diol having carbon atoms of 6 or less and a normal boiling point of 240° C. or more. The second ink composition contains a second pigment, and the alkyl diol. In the first ink composition, a content of the first pigment is 2.5% by [weight] *mass* or more, and a content of the alkyl diol is 3% by [weight] *mass* to 15% by [weight] *mass*. In the second ink composition, a content of the second pigment is less than 2.5% by [weight] *mass*, and the content of the alkyl diol is 8% by [weight] *mass* to 30% by [weight] *mass*. The content of the alkyl diol in the second ink composition is greater than the content of the alkyl diol in the first ink composition.

In this case, when the ink composition is applied to the recording medium in the state of the ink droplet, by increasing the content of the alkyl diol, it is possible to increase the wettability to the recording medium, and extend a dispersion region (region that spreads out wetly) of the pigment. Furthermore, even when the content of the pigment is relatively large, by reducing the content of the alkyl diol, it is possible to narrow the spread area of the pigment. Therefore, it is possible to control distribution of the pigment as the dot which is formed with the ink droplet by including plurally the content of the alkyl diol in accordance with the content of the pigment. Moreover, by making the composition according to the application example as an ink set, it is possible to provide the suitable ink set in a recording method using the ink jet recording system, for example.

Application Example 2

In the ink set according to the application example described above, the alkyl diol that is contained respectively in the first ink composition and the second ink composition may have a branch structure.

By using the alkyl diol having carbon atoms of 6 or less and the branch structure as a solvent, the favorable ink composition in the permeability and the wettability may be provided. As a result, even when the amount of the ink droplet for forming a recording image is increased or the diameter of the dot which is formed on the recording medium is increased, the pigment may be dispersed more favorably (in a more uniform direction) in the recording image. That is, in this case, it is possible to control the distribution of the pigment as the dot which is formed with the ink droplet (Application Example 1), and the distribution of the pigment can be performed favorably in the larger dot (Application Example 2). Therefore, for example, in the image recording of the ink jet recording system, even when the size (amount) of the ink droplet is increased or the image is formed in a small number of the dots, a favorable image which has small unevenness of the dot and small granular properties (feeling of grains) due to the dot can be obtained. As a result, the necessary time for recording can be made shorter while maintaining the favorable image. For example, the recording time can be shortened without increasing the driving speed of an ink jet recording head (discharging head) in an ink jet recording apparatus, or the recording can be performed without increasing the recording time with respect to the recording medium having the larger size.

Application Example 3

In the ink set according to the application examples described above, it would be better not to be contained an organic solvent having the normal boiling point of less than 240° C. substantially in the first ink composition and the second ink composition.

Thereby, the occurrence of the VOC in the image recording can be decreased and a degree of influence which is exerted on the environment can be decreased.

Application Example 4

In the ink set according to the application examples described above, it is preferable that the ink set further include a third ink composition containing a third pigment of which a content is greater than the content of the second pigment which is contained in the second ink composition, and the alkyl diol of which the content is greater than the content of the alkyl diol which is contained in the first ink composition, in which the first pigment is a chromatic color pigment, and the third pigment is a black pigment.

Thereby, in the recording (printing) of the image including the ink composition of the black, the favorable image where the granular properties are lightened can be obtained. In the recording method of full color using the ink jet recording system, the suitable ink set that obtains effects as described above can be provided.

Application Example 5

According to this application example, there may be provided a recording method using the ink set according to the application examples described above including discharging an ink droplet of the first ink composition and/or an ink droplet of the second ink composition using a discharging head to record an image on a recording medium.

In this case, even when the image is formed in a smaller number of the dots, it is possible to obtain the favorable image which has the small unevenness of the dot and the small granular properties due to the dot. As a result, it is possible to make the necessary time for recording shorter. That is, it is possible to shorten the recording time without increasing the driving speed of the discharging head, or perform the recording without increasing the recording time with respect to the recording medium having the larger size.

Application Example 6

In the recording method according to the application examples described above, it is preferable that the ink droplet is 10 picoliters or more.

In this case, when the image is recorded on the recording medium by discharging the ink droplet of the first ink composition and/or the ink droplet of the second ink composition using the discharging head, the ink droplet is 10 picoliters or more. Thereby, the dot diameter per one ink droplet can be made larger. As a result, the recording time can be shortened without increasing the driving speed of the discharging head, or the recording can be performed without increasing the recording time with respect to the recording medium having the larger size. Even in the case of the ink droplet of 10 picoliters or more, by using the ink set described above, the favorable image which has the small unevenness of the dot and the small granular properties (feeling of the grains) due to the dot can be obtained.

Application Example 7

In the recording method according to the application examples described above, it is preferable that a resolution of the image is 1000 dpi or less.

In this case, when the image is recorded on the recording medium by discharging the ink droplet of the first ink composition and/or the ink droplet of the second ink composition using the discharging head, by making the number of the dots smaller at the resolution of the image of 1000 dpi or less, the recording time can be shortened without increasing the driving speed of the discharging head, or the recording can be performed without increasing the recording time with respect to the recording medium having the larger size. Even in the case of the resolution of the image of 1000 dpi or less, by using the ink set described above, the favorable image which has the small unevenness of the dot and the small granular properties due to the dot can be obtained.

Application Example 8

According to this application example, there may be provided a recording apparatus that performs a recording by the recording method according to the application examples described above including a scanning mechanism that moves the discharging head, and a transfer mechanism that moves the recording medium, in which a movement of the discharging head by the scanning mechanism and a movement of the recording medium by the transfer mechanism are alternately repeated.

In this case, the image is recorded by the recording method according to the application examples described above. Thereby, even when the amount of the ink droplet is increased or the diameter of the dot which is formed on the recording medium is increased, it is possible to disperse the pigment more favorably (in the more uniform direction) in the recording image and it is possible to obtain the favorable image which has the small unevenness of the dot and the small granular properties due to the dot. In other words, since it is possible to form the effective image without repeating the discharging several times with respect to the same region, that is, without repeating (scanning) the movement of the discharging head, the movement of the discharging head by the scanning mechanism and the movement (transfer) of the recording medium by the transfer mechanism can be alternately repeated. As a result, it is possible to shorten the necessary time for image recording. The recording apparatus according to the application example is most suitable for the recording apparatus in which a higher throughput is desired, for example, the recording apparatus that prints the image on the recording medium having the large size at high speed.

Application Example 9

In the recording apparatus according to the application examples described above, the discharging head may be a line head.

In this case, the image is recorded by the recording method according to the application examples described above. Thereby, even when the amount of the ink droplet is more increased or the diameter of the dot which is formed on the recording medium is more increased, the pigment can be dispersed more favorably (in the more uniform direction) in the recording image and the favorable image which has the small unevenness of the dot and the small granular properties due to the dot can be obtained. That is, the discharging head can be configured as the line head in which the repeating (scanning) the movement of the discharging head several times is not necessary in order to form the image, or facilitates to have the configuration thereof. The configuration of the recording apparatus can be further simplified by configuring the discharging head as the line head, and the recording can be performed at higher speed by the configuration of the line head described above. In other words, the line head described above is most suitable for the recording apparatus in which the higher throughput is desired, for example, the recording apparatus that prints the image on the recording medium having the large size at high speed.

Application Example 10

According to this application example, there may be provided a recording material that is recorded using the ink set according to the application examples described above.

In this case, the recording material is recorded using the ink set according to the application examples described above. Thereby, the favorable image which has the small unevenness of the dot and the small granular properties due to the dot is recorded at higher speed by the recording apparatus of which the configuration is further simplified. Consequently, it is possible to obtain the recording material with more ease and at lower cost.

BRIEF DESCRIPTION OF THE DRAWING

The invention will be described with reference to the accompanying drawings, wherein like numbers reference like elements.

FIGURE is a perspective view illustrating an inkjet recording apparatus as a recording apparatus according to Embodiment 4.

DESCRIPTION OF EXEMPLARY EMBODIMENTS

Hereinafter, embodiments which realize the invention will be described. Furthermore, the followings are the embodiments of the invention, and the invention is not limited thereto.

First, an ink jet recording system, an ink composition and a recording medium which form a base of the invention, will be described.

Ink Jet Recording System

The ink jet recording system indicates the recording method such as the system in which a strong electric field is applied between a nozzle and an acceleration electrode which is arranged in front of the nozzle, the ink (ink composition) from the nozzle is continuously ejected (discharged) in the form of an ink droplet, a recording information signal is applied to a deflection electrode while the ink droplet flies between the deflection electrodes, and thereby the recording is performed, the system (electrostatic attraction system) in which the ink droplet is ejected corresponding to the recording information signal without deflecting the ink droplet, the system in which a pressure is applied to an ink liquid with a small pump, the nozzle is mechanically vibrated by a crystal vibrator or the like, and thereby the ink droplet is forcibly ejected, the system (piezo system) in which the pressure and the recording information signal are simultaneously applied to the ink liquid with a piezoelectric element, and thereby the ink droplet is ejected and recorded, and the system (thermal jet system) in which the ink liquid foams by heating with a microelectrode according to the recording information signal, and thereby the ink droplet is ejected and recorded. For example, the recording according to the method is performed by the ink jet recording apparatus including an ink jet type discharging head, a tray, a discharging head driving mechanism, a carriage or the like.

Ink Composition

By the ink jet recording system as described above, an image is formed (recorded) using the plural ink composition. The ink composition is configured of a pigment, a specific alkane diol or the like. In addition, the ink composition may include water, at least one kind of an organic solvent, a resin, or a surfactant, as a solvent.

For example, the ink composition is the ink set of four colors which is made by adding black (K) to the ink set of three colors of yellow (Y), magenta (M) and cyan (C), as an ink set which is formed of dark ink compositions. Furthermore, for example, the ink composition is the ink set of eight colors which is made by adding the ink set of light yellow (Ly), light magenta (Lm), light cyan (Lc) and light black (Lk) which is formed of light ink compositions to lighten a concentration of each color material thereto.

Pigment as Color Material

The pigment is not particularly limited, but an organic pigment and an inorganic pigment may be used.

As an inorganic pigment, carbon black (C.I. Pigment Black 7) such as furnace black, lamp black, acetylene black and channel black, iron oxide, titanium oxide or the like, may be used.

As an example of organic pigment, an azo pigment such as insoluble azo pigment, condensed azo pigment, azo lake and chelate azo pigment, a polycyclic pigment such as phthalocyanine pigment, perylene and perynone pigment, anthraquinone pigment, quinacridone pigment, dioxane pigment, thioindigo pigment, isoindolinone pigment and quinophthalone pigment, a dye chelate (for example, a basic dye type chelate or an acid dye type chelate), a dye lake (a basic dye type lake, an acid dye type lake), a nitro pigment, a nitroso pigment, aniline black, a daylight fluorescent pigment or the like may be used. The pigments described above may be used alone, or two or more kinds thereof may be used together.

As an example of yellow organic pigment, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, 213 or the like, may be used.

As an example of magenta organic pigment, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, or C.I. Pigment Violet 19, 23, 32, 33, 36, 38, 43, 50 or the like, may be used.

As an example of cyan organic pigment, C.I. Pigment Blue 1, 2, 3, 15, 15:1, 15:2, 15:3, 15:4, 15:6, 15:34, 16, 18, 22, 25, 60, 65, 66, or C.I. Vat Blue 4, 60 or the like, may be used.

As an example of green pigment, C.I. Pigment Green 7 (phthalocyanine green), 10 (green gold), 36, 37, 58 or the like, may be used. One or more kinds thereof may be used. In the examples, the phthalocyanine based pigment such as C.I. Pigment Green 7, 36, 37 and 58 is preferable.

As an orange pigment, for example, C.I. Pigment Orange 2, 5, 7, 13, 14, 15, 16, 24, 34, 36, 38, 40, 43, 63, and 64 may be used. In the examples, Pigment Orange 36 or 43 is preferable.

Water

In the case of including the water in the ink composition, the water mainly functions as a dispersion medium to disperse the pigment. The ink composition may be a water based ink including the water of 25% by [weight] *mass* or more, or a non-water based ink including the water of less than 25% by [weight] *mass*. However, the water based ink in which a fixing property of the pigment and an orientation thereof on the recording medium are improved by reducing the solvent rapidly on the recording medium, is more preferable.

Organic Solvent

In the ink composition, a polyhydric alcohol, a glycol ether or the like may be contained as an organic solvent.

Polyhydric Alcohol

As a polyhydric alcohol, for example, ethylene glycol, diethylene glycol, triethylene glycol, polyethylene glycol, polypropylene glycol, propylene glycol, butylene glycol, 1,2,6-hexane triol, thioglycol, hexylene glycol, glycerin, trimethylol ethane, trimethylol propane, 1,2-butanediol, 1,2-pentanediol, 3-methyl-1,5-pentanediol, 1,2-hexanediol, 1,6-hexanediol, 1,2-heptanediol, and 1,2-octane diol may be used.

In the invention, an alkyl diol having carbon atoms of 6 or less and a branch structure, is used as a polyhydric alcohol. The embodiments and the examples described below will be described in detail.

Glycol Ether

As an example of glycol ether, a lower alkyl ether of the polyhydric alcohol such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether and tripropylene glycol monomethyl ether, may be used.

Resin

The Resin which is included in the ink composition functions as a dispersing agent to disperse the pigment. As an example of resin, a cellulose based resin such as polyacrylic acid, polymethacrylic acid, polymethacrylic acid ester, poly ethyl acrylate, styrene butadiene copolymer, polybutadiene, acrylonitrile butadiene copolymer, chloroprene copolymer, fluorine resin, fluorinated vinylidene, polyolefin resin, cellulose, styrene acrylic acid copolymer, styrene methacrylic acid copolymer, polystyrene, styrene acrylamide copolymer, polyisobutyl acrylate, polyacrylonitrile, polyvinyl acetate, polyvinyl acetal, polyvinyl pyrrolidone, polyamide, rosin based resin, fluorene based resin, polyethylene, polycarbonate, vinylidene chloride resin and cellulose acetate butyrate, may be used. In addition, vinyl acetate resin, ethylene vinyl acetate copolymer, vinyl acetate acrylic copolymer, vinyl chloride resin, polyurethane, rosin ester or the like may be used as an example of resin. However, the resin is not limited thereto.

Surfactant

A type of the surfactant is not particularly limited, but an acetylene glycol based surfactant or a polysiloxane based surfactant is preferable. The acetylene glycol based surfactant or the polysiloxane based surfactant can increase the wettability of the ink to a recorded surface of the recording medium or the like, and increase the permeability of the ink.

Other Component

The ink composition may be include a component (other component) other than the components described above. As other component, a drying control agent such as a pH adjusting agent, a penetrating agent, an organic binder, a urea based compound, a saccharide and alkanolamine (triethanolamine or the like) may be used.

Recording Medium

The recording medium is not particularly limited, and various recording mediums such as plain paper, dedicated paper for ink jet (matte paper, glossy paper), a plastic film such as vinyl chloride resin, a film coated with plastic or a receiving layer on a substrate can be used as a recording medium.

Next, the embodiments which realize the invention will be described. Moreover, the followings are the embodiments of the invention, and the invention is not limited thereto.

Embodiment 1

First, an ink set according to Embodiment 1 will be described.

The ink set according to the embodiment includes a first ink composition and a second ink composition.

The first ink composition is the dark ink composition having a pigment concentration of 2.5% by [weight] *mass* or more (in the case of dark ink, the pigment is a first pigment). That is, the first ink composition contains the first pigment of which a content is 2.5% by [weight] *mass* or more, and an alkyl diol of which the content is 3% by [weight] *mass* to 15% by [weight] *mass* (preferably, 3% by [weight] *mass* to 10% by [weight] *mass*).

For example, in the ink composition of colors such as yellow (Y), magenta (M), cyan (C), orange (Or) and green (Gr), a chromatic color organic pigment corresponding to each color is used as a first pigment. Moreover, for example, in the ink composition of black (K), a black pigment (inorganic pigment) is used as a first pigment.

The second ink composition is the light ink composition having the pigment concentration of less than 2.5% by [weight] *mass* (in the case of light ink, the pigment is a second pigment). That is, the second ink composition contains the second pigment of which the content is less than 2.5% by [weight] *mass*, and the alkyl diol of which the content is 8% by [weight] *mass* to 30% by [weight] *mass* (preferably, 8% by [weight] *mass* to 20% by [weight] *mass*) and greater than the content of the alkyl diol contained in the first ink composition. At that time, the content of the alkyl diol is greater than the content of the alkyl diol in the first ink composition as described above. The preferable content of the first pigment is 2.5% by [weight] *mass* to 8% by [weight] *mass*. Moreover, the preferable content of the second pigment is 0.05% by [weight] *mass* to 1% by [weight] *mass*.

For example, in the ink composition of colors such as light yellow (Ly), light magenta (Lm) and light cyan (Lc), the organic pigment corresponding to each color is used as a second pigment. Moreover, in the ink composition of gray (Lk) and light gray (LLk), the black pigment (inorganic pigment) is used.

The alkyl diol that is contained respectively in the first ink composition and the second ink composition has carbon atoms of 6 or less and a normal boiling point of 240° C. or more. Specifically, as an example of alkyl diol, 3-methyl-1,5-pentanediol, 1,6-hexanediol or the like may be used. More preferably, the alkyl diol may have the branch structure. Most preferably, 3-methyl-1,5-pentanediol is used. By using the organic solvent group as described above, it is possible to secure favorable permeability and suppress the amount of the VOC.

It is preferable that the organic solvent having the normal boiling point of less than 240° C. is not contained substantially in the first ink composition and the second ink composition from the viewpoint of the amount of the VOC.

Here, such that the organic solvent is not substantially contained means the case that 1.0% by [weight] *mass* or more is not contained with respect to total mass of the ink (100% by [weight] *mass*). 0.5% by [weight] *mass* or more is preferable, and 0.1% by [weight] *mass* or more is more preferable. 0.05% by [weight] *mass* or more is further preferable, 0.01% by [weight] *mass* or more is still further preferable, and 0.001% by [weight] *mass* or more is most preferable.

According to the ink set according to the embodiment, it is possible to obtain the following effects.

When the ink composition is applied to the recording medium in the form of the ink droplet (the droplet of the ink), it is possible to increase the wettability to the recording medium, and extend a dispersion region (region that spreads out wetly) of the pigment, by increasing the content of the alkyl diol. The content of the second pigment which is contained in the light ink composition is smaller than the content of the first pigment which is contained in the dark ink composition, but the content of the alkyl diol in the light ink composition is large. Therefore, it is possible to enlarge a wet spread of the light ink composition and obtain the favorable image which has the small unevenness of the dot and the small granular properties due to the dot. Furthermore, since it is easy to dry by enlarging the wet spread, it is possible to increase the implantation amount (application amount) of the ink droplet.

In other words, even when the content of the pigment is relatively large, by reducing the content of the alkyl diol, it is possible to narrow the spread area of the pigment. Since the content of the alkyl diol in the dark ink composition is relatively small in comparison with the light ink composition, the spread area of the pigment is relatively narrow. However, in the case of the dark ink composition having high pigment concentration, even if the spread area of the pigment becomes narrow, the problem such as the granular properties is difficult to occur.

Therefore, it is possible to control distribution of the pigment as the dot which is formed with the ink droplet, by providing plurally the content of the alkyl diol in accordance with the content of the pigment. Furthermore, as an ink set, the first ink composition containing the alkyl diol of which the content is 3% by [weight] *mass* to 15% by [weight] *mass*, and the second ink composition containing the alkyl diol of which the content is 8% by [weight] *mass* to 30% by [weight] *mass* and greater than the content of the alkyl diol contained in the first ink composition are included, and thus it is possible to provide the suitable ink set for the recording method using the ink jet recording system.

As the penetrating agent, by using the alkyl diol having carbon atoms of 6 or less and the normal boiling point of 240° C. or more, it is possible to provide the favorable ink composition in permeability and wettability. As a result, even when the amount of the ink droplet for forming the recording image is increased and the diameter of the dot which is formed on the recording medium is increased, the distribution of the pigment is performed more favorably (in the more uniform direction) in the recording image. That is, according to the embodiment, it is possible to control the distribution of the pigment as the dot which is formed with the ink droplet, and it is possible to perform the distribution of the pigment more favorably in the larger dot. Therefore, in the image recording of the ink jet recording system, even when the size (amount) of the ink droplet is more increased or the image is formed in a small number of dots, it is possible to obtain the favorable image which has the small unevenness of the dot and the small granular properties due to the dot. As a result, it is possible to make the necessary time for recording shorter while maintaining the favorable image. It is possible to shorten the recording time without increasing the driving speed of the ink jet recording head (discharging head) in the ink jet recording apparatus, or perform the recording without increasing the recording time with respect to the recording medium having the larger size.

In addition, since the penetrating agent having the normal boiling point of less than 240° C. is not used in the first ink composition and the second ink composition, it is possible to decrease the occurrence of the VOC in the image recording and decrease the degree of influence which is exerted on the environment.

Examples and Comparative Examples

Hereinafter, the ink set according to the invention will be described with examples and comparative examples in detail.

Moreover, the scope of the invention is not limited thereto.

Table 1 shows the configuration of the ink composition which is specifically adjusted as the first ink composition and the second ink composition.

As a first ink composition of the dark ink composition, the ink composition of yellow (Y), magenta (M), cyan (C) and black (K) was prepared.

As a second ink composition of the light ink composition, the ink composition of light magenta (Lm), light cyan (Lc), gray (Lk) and light gray (LLk) was prepared.

In the pigment, Pigment Yellow 74 as yellow (Y), Pigment Blue 15:3 as cyan (C) and light cyan (Lc), Pigment Violet 19 as magenta (M) and light magenta (Lm), and carbon black as black (K), gray (Lk) and light gray (LLk), were used at the content thereof shown in Table 1, respectively.

Styrene acrylic acid copolymer as a dispersing agent of resin, BYK-348 (manufactured by BYK-Chemie Japan KK) as a surfactant, glycerin as a polyhydric alcohol, and triethanolamine as a drying control agent, were used at the content thereof shown in table 1, respectively.

TABLE 1

(% by [weight] *mass*)

| | Dark Ink (First Ink Composition) | | | | Light Ink (Second Ink Composition) | | | |
|---|---|---|---|---|---|---|---|---|
| | Y | M | C | K | Lm | Lc | Lk | LLk |
| Pigment | 5 | 5 | 4 | 2.5 | 1 | 1 | 0.8 | 0.3 |
| Glycerin | 10 | 10 | 10 | 15 | 22 | 22 | 22 | 24 |
| Surfactant (BYK-348) | 0.5 | 0.6 | 0.4 | 0.5 | 0.5 | 0.5 | 0.5 | 0.5 |
| Triethanolamine | 1 | 1 | 1 | 1 | 1 | 1 | 1 | 1 |
| Resin (Dispersing Agent) (Styrene Acrylic Acid Copolymer) | 3 | 3 | 2.8 | 2.5 | 2 | 2 | 1.2 | 0.6 |

TABLE 1-continued

| (% by [weight] *mass*) | | | | | | | | |
|---|---|---|---|---|---|---|---|---|
| | Dark Ink (First Ink Composition) | | | | Light Ink (Second Ink Composition) | | | |
| | Y | M | C | K | Lm | Lc | Lk | LLk |
| Alkyl Diol | See TABLE 2 | | | | | | | |
| Water | Residual Amount | | | | | | | |

Table 2 shows Examples 1 to 6 and Comparative Examples 1 to 4 of the ink set according to the first ink composition and the second ink composition described above, which were adjusted by varying the type of the alkyl diol and the content thereof. To Table 2, an evaluation result of the occurrence amount of the VOC and the evaluation result of granular quantity are added with respect to each ink set.

As an alkyl diol, 3-methyl-1,5-pentane diol (MPD) and 1,6-hexane diol (1,6-HD) were used. In Comparative Example 1, when the VOC was evaluated, 1,2-hexanediol (1,2-HD) having the normal boiling point in a range of 223° C. to 224° C. was used.

In the evaluation of the occurred VOC, PX-H8000 (manufactured by Seiko Epson Corporation) was used as an ink jet recording apparatus, and the evaluation was performed according to a measurement method and evaluation conditions by Blue Angel (German environmental label). The standard of determination is shown as follows.

Determination of VOC: good "A" . . . VOC 5 mg/hour or less bad "C" . . . VOC 5 mg/more than hour The evaluation of the granular properties was performed according to "Image Quality Evaluation of Ink Jet" in Journal of the Imaging Society of Japan (Japan hardcopy '99 collected papers (P291 to 294)). Specifically, the dedicated image (gradation patch) for granularity evaluation was printed using the ink composition of Examples 1 to 6 and Comparative Examples 1 to 4, an obtained printing material was taken in by a scanner as electronic data, and a calculation of granularity index value was performed by a dedicated software.

In the ink jet recording apparatus, the printing was performed at 720×720 dpi using PX-H8000 (manufactured by Seiko Epson Corporation). The glossy paper for photograph (photographic paper (gloss) manufactured by Seiko Epson Corporation) was used as a recording medium. GT-X770 (manufactured by Seiko Epson Corporation) was used as a scanner, and the image data was taken in at the resolution of 1200 dpi in the analysis target region of 256×256 pixels, as an analysis data.

The evaluation of the granular properties was performed according to the following standard of the determination, with respect to the calculated granularity index value.

Determination of granular properties: good "A" . . . granularity index is 0.28 or less approximately good "B" . . . granularity index is more than 0.28 and less than 0.30

Bad "C" . . . granularity index is 0.30 or more

TABLE 2

| | | Content of Alkyl Diol (% by [weight] *mass*) | | | |
|---|---|---|---|---|---|
| | | Dark Ink (First Ink Composition) | Light Ink (Second Ink Composition) | Evaluation | |
| | Alkyl Diol | | | VOC | Granular properties |
| Example 1 | MPD | 5% | 10% | A | A:0.27 |
| Example 2 | MPD | 5% | 15% | A | A:0.28 |
| Example 3 | MPD | 5% | 20% | A | A:0.27 |
| Example 4 | MPD | 3% | 10% | A | A:0.28 |
| Example 5 | 1.6-HD | 5% | 10% | A | B:0.29 |
| Example 6 | 1.6-HD | 8% | 15% | A | A:0.28 |
| Comparative Example 1 | 1.2-HD | 5% | 5% | C | A:0.27 |
| Comparative Example 2 | MPD | 5% | 5% | A | C:0.31 |
| Comparative Example 3 | 1.6-HD | 5% | 5% | A | C:0.35 |
| Comparative Example 4 | MPD | 2% | 10% | A | C:0.32 |

As shown in Table 2, the ink compositions (Examples 1 to 6) according to Embodiment 1 obtained good results ("A" or "B") in the evaluation of the VOC and the evaluation of the granular properties. In addition, Comparative Examples 1 to 4 not according to Embodiment 1, obtained poor determination of "C" in both of the evaluation of the VOC and the evaluation of the granularity quality.

Embodiment 2

Next, the ink set according to Embodiment 2 will be described.

Embodiment 2 includes the ink composition of black (K) as a third ink composition, and has a feature including the composition which is different from the first ink composition.

The ink set according to Embodiment 2 includes the first ink composition, the second ink composition and the third ink composition.

The third ink composition is the ink composition of black (K), and includes a third pigment of which the content is greater than the content of the first pigment in the first ink composition, and the alkyl diol of which the content is greater than the content of the alkyl diol contained in the first ink composition.

As the third pigment, the black pigment is used (inorganic pigment). As the black pigment, it is possible to use carbon black (C.I. Pigment Black 7) such as furnace black, lamp black, acetylene black and channel black.

According to the ink set according to the embodiment, it is possible to obtain the favorable image which has the smaller granular properties, in the recording (printing) of the image including the ink composition of black (K) in which the problem of the granularity easily occurs in comparison with the ink of other color. By using the first ink composition, the second ink composition and the third ink composition as an ink set, it is possible to provide the suitable ink set to obtain the effect as described above, in the recording method of full color using the ink jet recording system.

Embodiment 3

Next, a recording method according to Embodiment 3 will be described.

Embodiment 3 is the recording method using the ink set as described above.

In the recording method, using the discharging head, the ink droplet of at least one ink composition of the first ink composition, the second ink composition and the third ink composition shown in Embodiment 1 and Embodiment 2 is discharged, and the image is recorded on the recording medium. In addition, the ink droplet is 10 picoliters or more (for example, 15 picoliters), and the resolution of the image is 1000 dpi or less (for example, 720 dpi) together (length and width).

According to the recording method according to the embodiment, even in the case of forming in a smaller number of dots (hereinafter, 1000 dpi or less), it is possible to obtain the favorable image which has the small unevenness of the dot and the small granular properties due to the dot. As a result, it is possible to make the necessary time for recording shorter. That is, it is possible to shorten the recording time without increasing the driving speed of the discharging head, or perform the recording without increasing the recording time with respect to recording medium having the larger size.

Furthermore, as in the embodiment, when the image is recorded on the recording medium by discharging the ink droplet using the discharging head, the ink droplet is 10 picoliters or more. Thereby, it is possible to make the dot diameter per one ink droplet larger. As a result, in the same manner, it is possible to shorten the recording time without increasing the driving speed of the discharging head, or perform the recording without increasing the recording time with respect to the recording medium having the larger size. Even when the ink droplets is 10 picoliters or more, by using the ink set as described above, it is possible to obtain the favorable image which has the small unevenness of the dot and the small granular properties due to the dot.

Embodiment 4

Next, a recording apparatus according to Embodiment 4 will be described.

Embodiment 4 is the recording apparatus using the ink set as described above.

FIGURE is a perspective view illustrating an ink jet recording apparatus 1 (printer) as an example of the recording apparatus.

In FIGURE, the ink jet recording apparatus 1 is arranged in an approximately horizontal X-Y plane.

The ink jet recording apparatus 1 includes an ink jet type recording head 20 as a discharging head, a carriage 3, a carriage driving mechanism 4 as a scanning mechanism, a control board 5, an ink cartridge 6, a recording medium supply and exhaust mechanism (not shown) as a transport mechanism and a platen 8.

The ink jet type recording head 20 and the ink cartridge 6 are loaded in the carriage 3, and the carriage 3 performs the recording by discharging the ink droplet (ink composition) in an approximately vertical direction (−Z direction of FIGURE) while scanning (reciprocating operation in X direction of FIGURE) on a surface of the recording medium 10 by the carriage driving mechanism 4.

The control board 5 performs the driving control of the carriage driving mechanism 4, the discharge control of the ink droplet, the control of the supply, transport and exhaust of the recording medium 10 and the like.

The ink cartridge 6 is divided into plural mounting parts, accommodates the plural ink compositions shown in Embodiment 1 and Embodiment 2.

The recording medium supply and exhaust mechanism moves (transport) the recording medium 10 in the direction (Y direction of FIGURE) intersecting with the scanning direction of the carriage 3.

The recording medium 10 is placed in the platen 8, and the platen 8 regulates the distance between the ink jet type recording head 20 and the recording medium 10.

The ink jet recording apparatus 1 alternately repeats the movement of the ink jet type recording head 20 by the carriage driving mechanism 4, and the movement of the recording medium 10 by the recording medium supply and exhaust mechanism.

According to the ink jet recording apparatus 1 according to the embodiment, the recording is performed by the recording method according to Embodiment 3. Consequently, even when the amount of the ink droplet is more increased or the diameter of the dot which is formed on the recording medium 10 is more increased, it is possible to perform the distribution of the pigment more favorably (in the more uniform direction) in the recording image, and obtain the favorable image which has the small unevenness of the dot and the small granular properties due to the dot. In other words, it is possible to form the effective image without repeating the discharging several times with respect to the same region, that is, without repeating (scanning) the movement of the ink jet type recording head 20. Therefore, it is possible to repeat alternately the movement of the ink jet type recording head 20 by the carriage driving mechanism 4 and the movement of the recording medium 10 by the recording medium supply and exhaust mechanism. As a result, it is possible to shorten the necessary time for image recording. The ink jet recording apparatus 1 is most suitable for the recording apparatus in which a higher throughput is desired, for example, the recording apparatus that prints the image on the recording medium having the large size at high speed.

The discharging head may be a line head not accompanied with the carriage driving mechanism 4 as a scanning mechanism. Since the recording is performed by the recording method according to Embodiment 3, it is possible to perform the distribution of the pigment more favorably (in the more uniform direction) in the recording image, and obtain the favorable image which has the small unevenness of the dot and the small granular properties due to the dot even when the amount of ink droplet is more increased or the diameter of the dot which is formed on the recording medium 10 is more increased. That is, the discharging head can be configured as the line head in which the repeating (scanning) the movement of the discharging head several times is not necessary in order to form the image, or facilitates to have the configuration thereof. The configuration of the recording apparatus can be further simplified by configuring the discharging head as the line head, and the recording can be performed at higher speed by the configuration of the line head described above. In other words, the line head described above is most suitable for the recording apparatus in which the higher throughput is desired, for example, the recording apparatus that prints the image on the recording medium having the large size at high speed.

In the recording apparatus adopting the line head, the relative transport speed between the line head and the recording medium is preferably 5 cm/s or more. 8 cm/s or more is further preferable, and the speed which is 10 cm/s to 50 cm/s is still further preferable.

Embodiment 5

Next, a recording material according to Embodiment 5 will be described.

Embodiment 5 is the recording material that is recorded on the recording medium as described above, using the ink set (ink set in at least one ink composition of the first ink composition, the second ink composition and the third ink composition which are shown as an example in Embodiment 1 and Embodiment 2) as described above.

The recording material is recorded using the ink set as described above. Therefore, the favorable image which has the small unevenness of the dot and the small granular properties due to the dot is recorded at higher speed by the recording apparatus of which the configuration is further simplified. Consequently, it is possible to obtain the recording material with more ease and at lower cost.

The entire disclosure of Japanese Patent Application No. 2013-043796, filed Mar. 6, 2013 is expressly incorporated by reference herein.

What is claimed is:

1. An ink set comprising:

a first ink composition containing a first pigment of 2.5% by [weight] *mass* or more, and an alkyl diol of 3% by [weight] *mass* to 15% by [weight] *mass*, the alkyl diol having carbon atoms of 6 or less and a normal boiling point of 240° C. or more; [and]

a second ink composition containing a second pigment [of less than 2.5%] *in the range of 0.05% by mass to 1.0%* by [weight] *mass*, and the alkyl diol of 8% by [weight] *mass* to 30% by [weight] *mass*, the second ink composition having higher content of the alkyl diol than the first ink composition [having]*; and*

*a third ink composition containing a third pigment of which a content is greater than the content of the second pigment which is contained in the second ink composition, and the alkyl diol of which the content is greater than the content of the alkyl diol which is contained in the first ink composition,*

*wherein the first pigment is a chromatic color pigment and the third pigment is a black pigment.*

2. The ink set according to claim 1, wherein the alkyl diol that is contained in the first ink composition and the second ink composition has a branch structure.

3. The ink set according to claim 1, wherein an organic solvent having a normal boiling point of less than 240° C. is not contained substantially in the first ink composition and the second ink composition.

[4. The ink set according to claim 1, further comprising:

a third ink composition containing a third pigment of which a content is greater than the content of the second pigment which is contained in the second ink composition, and the alkyl diol of which the content is greater than the content of the alkyl diol which is contained in the first ink composition, wherein the first pigment is a chromatic color pigment, and the third pigment is a black pigment.]

5. A recording method using the ink set according to claim 1, comprising:

discharging an ink droplet of the first ink composition and/or an ink droplet of the second ink composition *and discharging an ink droplet of the third composition* using a discharging head to record an image on a recording medium.

6. The recording method according to claim 5, wherein the ink droplet is 10 picoliters or more.

7. The recording method according to claim 5, wherein a resolution of the image is 1000 dpi or less.

8. A recording apparatus [that performs recording by the recording method according to claim 5,] comprising:

a scanning mechanism that moves [the] *a* discharging head;

*an ink cartridge containing the ink set according to claim 1;* and a transfer mechanism that moves [the] *a* recording medium, wherein a movement of the discharging head by the scanning mechanism and a movement of the recording medium by the transfer mechanism are alternately repeated.

9. [A] *The* recording apparatus [that performs recording by the recording method] according to claim [5] *8*, wherein the discharging head is a line head.

10. A recording material that is recorded using the ink set according to claim 1.

* * * * *